(No Model.)
C. F., A. W. & A. L. LAWTON.
APPARATUS FOR MANUFACTURING SALT.
No. 475,574. Patented May 24, 1892.
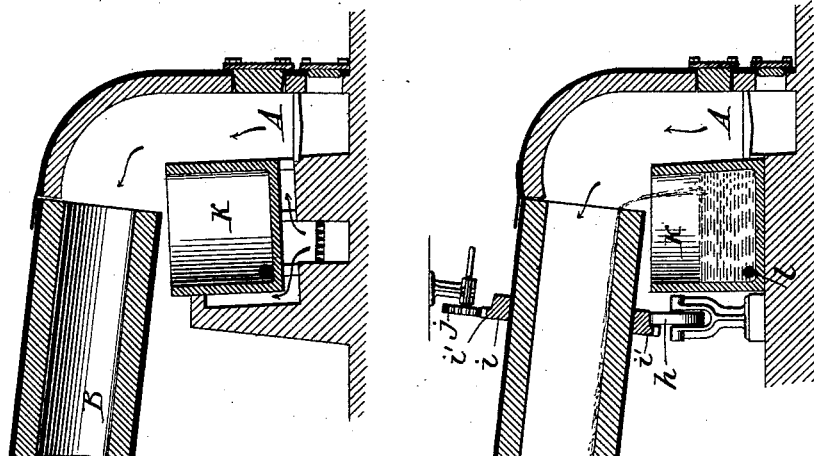
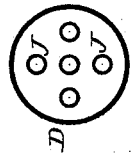
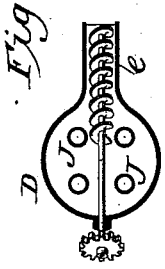
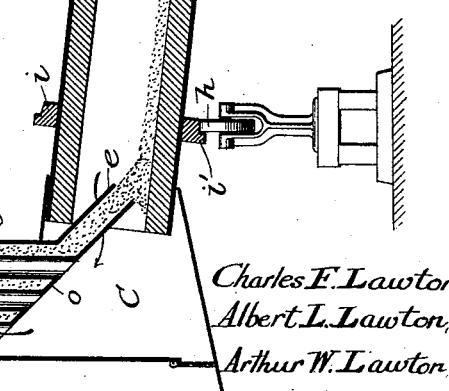
Charles F. Lawton,
Albert L. Lawton,
Arthur W. Lawton,
Inventors,
by Dodge & Sons,
attorneys
Attest
Sidney P. Hellingsworth
James F. Duhamel
THE NORRIS PETERS CO., PHOTO-LITHO., WASHINGTON, D. C.

UNITED STATES PATENT OFFICE.

CHARLES F. LAWTON, ARTHUR W. LAWTON, AND ALBERT L. LAWTON, OF ROCHESTER, NEW YORK.

APPARATUS FOR MANUFACTURING SALT.

SPECIFICATION forming part of Letters Patent No. 475,574, dated May 24, 1892.

Application filed March 10, 1891. Serial No. 384,491. (No model.)

*To all whom it may concern:*

Be it known that we, CHARLES F. LAWTON, ARTHUR W. LAWTON, and ALBERT L. LAWTON, citizens of the United States, residing at Rochester, in the county of Monroe and State of New York, have invented certain new and useful Improvements in Apparatus for the Manufacture of Salt, of which the following is a specification.

Our invention relates to the manufacture of salt; and it consists in a novel construction of an apparatus for carrying out the process set forth in our pending application, Serial No. 380,783, which process, briefly stated, consists in subjecting the salt to the action of heat and of a material of an alkaline nature.

In the drawings, Figure 1 is a vertical longitudinal sectional view of our improved apparatus. Fig. 2 is a horizontal sectional view on the line $xx$ of Fig. 1; Fig. 3, a similar view of a modified construction, and Fig. 4 a view illustrating a slight modification.

Referring again to the drawings, A indicates the fireplace in which the fuel is burned to produce the heat for melting the salt.

B indicates an elongated rotary cylinder constructed, advisably, of iron and lined with fire-brick of the ordinary kind or of bricks composed largely of lime and magnesia, with enough silicate to give them proper coherence, or of bricks made of lime, magnesia, and clay. This cylinder or tube is arranged in an inclined position, with its discharge end lowermost and in communication with the fireplace, as clearly shown in Figs. 1 and 4. The cylinder or tube is encompassed by two or more rings $i$, which bear upon suitable wheels or rollers $h$, mounted in fixed bearings and serving to support and sustain the cylinder during its rotation.

It will be noticed upon reference to Fig. 1 that the rings or bands $i$ are flanged, as at $i'$, and provided with gear-teeth, with which engages a pinion $j$. This pinion may be turned or rotated from any suitable power (not shown) and imparts to the cylinder a rotary motion, which may be slow or fast, as desired.

Immediately beneath the lower edge or end of the tube or cylinder D is placed a receptacle K, adapted to receive the melted salt discharged from the tube or cylinder, said receptacle being provided near its bottom with an outlet $l$, through or by means of which the salt is removed in a melted condition from the said receptacle.

The higher or upper end of the tube or cylinder B opens into the side of a chamber C, formed at the bottom of the shell or casing D. This shell or casing D comprises a series of vertical flues or tubes J, which open at their lower ends to the chamber C and at their upper ends into a flue or chimney E, so that the gases and products of combustion after leaving the furnace and passing lengthwise through the tube or cylinder B may pass into the chamber C, thence up through the flues J J, and finally out through the stack or chimney E. The chamber C serves as a collecting-chamber for the dust, &c.

At its upper end the shell or casing D is made flaring or conical, so as to form a hopper, in which the crushed or broken salt is fed. The salt in this condition passes downward around the tubes J and falls onto the bottom plate $o$ of the hopper thus formed.

At its lower end the shell or casing D is fashioned into a discharge-spout $e$, which, as shown in Fig. 1, extends inwardly into the open upper end of the rotary tube or cylinder B and delivers the crushed salt from the said shell or casing D into the interior of the rotary tube.

When the bottom of the shell or casing D inclines or slopes considerably, as shown in Fig. 1, the material will fall or run into and through the spout with little or no difficulty; but where the raw salt is of a kind that packs on drying in the shell or casing D a screw-feed may be used, as represented in Fig. 3, one of the tubes or flues in such case being omitted.

The operation of the apparatus is as follows: The cold powdered salt is mixed or sprinkled with the ingredients that are to be used in purifying it and then fed into the hopper-shaped top of the shell or casing B, the fire being started in the furnace A, and after the apparatus has become well warmed up the cylinder B is made to rotate slowly by the means hereinbefore described. The products of combustion and gases passing lengthwise through the tube or cylinder B and up through the vertical tubes J heat the salt contained within the shell or casing D. The heated salt is now fed down through the spout e into the cylinder B, and as the latter rotates slowly the salt gradually works its way downward and forward toward the lower end of the cylinder, becoming hotter and hotter as it works forward toward the furnace until it finally melts and flows in a molten stream into the large receptacle K. Here the impurities settle to the bottom and are drawn off from time to time through the hole or opening $l$, the purified salt being drawn off through the same opening or tube immediately after the removal of the dross.

When it is desired to keep the melted salt in the receptacle K in a melted state for a considerable length of time, a fireplace may be constructed under the receptacle, as illustrated in Fig. 4, the hot gases from the fire passing between the brick support of the vessel K, and then up around the sides of the same vessel, and finally into the tube B and add to the heat from the furnace A.

Where more economy of fuel is desired, the shell or casing D, with its flues, may be extended upward to a great height and the outside of the furnace A, cylinder B, and shell or casing D surrounded with a thick mass of suitable non-conducting material.

Having thus described our invention, what we claim is—

1. In an apparatus for melting or purifying rock or mined salt, the combination, with a tube or cylinder B, of the furnace A, a molten-salt receptacle K, and a shell or casing D at the upper end of the cylinder, said shell or casing being provided with a series of flues extending vertically through the salt-space.

2. In combination with a tube or cylinder B, a furnace, and a receptacle K at one end of said tube or cylinder and a shell or casing at the opposite end of said tube or cylinder, provided with a dust-collecting chamber C, a funnel-shaped mouth, and a series of flues J, opening at their lower ends into the dust-collecting chamber, but formed at their upper ends into a chimney E.

In witness whereof we hereunto set our hands in the presence of two witnesses.

CHAS. F. LAWTON.
   ARTHUR W. LAWTON.
   ALBERT L. LAWTON.

Witnesses:
 E. F. TURK,
 D. C. BARNUM.